Figure 1:
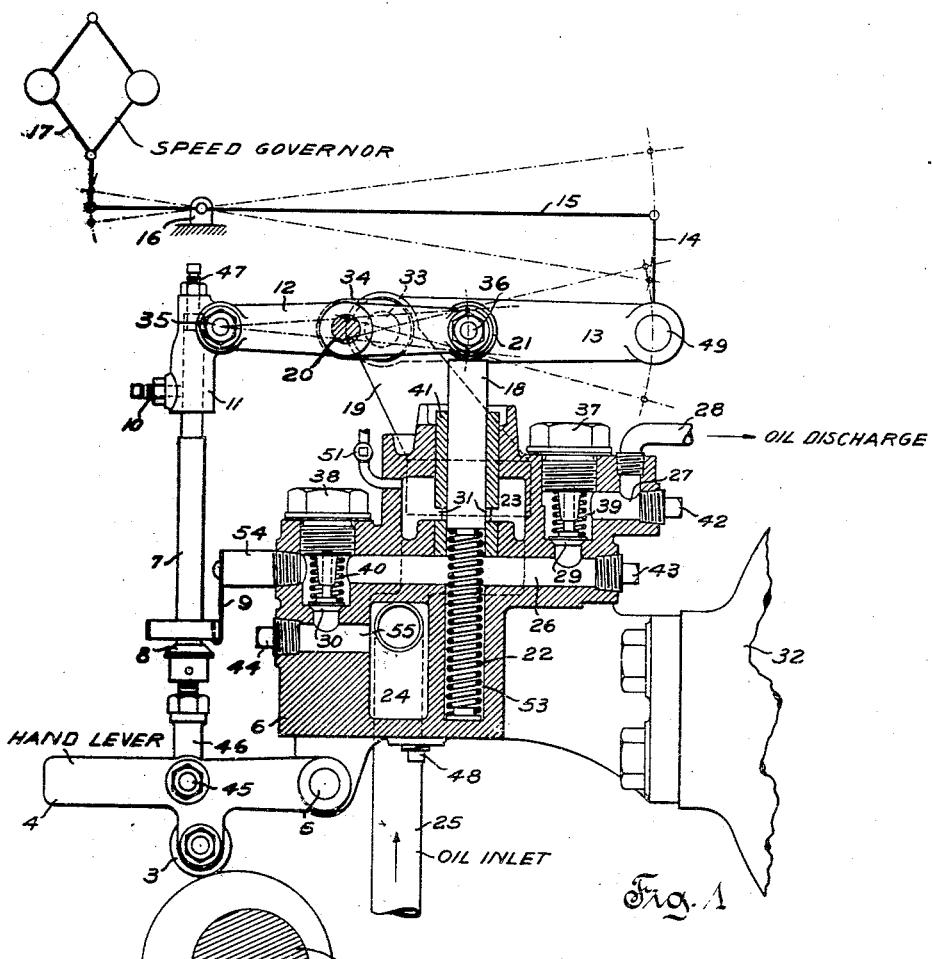

C. G. SPRADO.
REGULATOR FOR COMBUSTION ENGINES.
APPLICATION FILED OCT. 5, 1914.

1,143,328.

Patented June 15, 1915.

UNITED STATES PATENT OFFICE.

CARL G. SPRADO, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

REGULATOR FOR COMBUSTION-ENGINES.

1,143,328.  Specification of Letters Patent.  Patented June 15, 1915.

Application filed October 5, 1914. Serial No. 865,606.

*To all whom it may concern:*

Be it known that I, CARL G. SPRADO, a citizen of the United States, residing at Milwaukee, in the county of Milwaukee and State of Wisconsin, have invented a certain new and useful Improvement in Regulators for Combustion-Engines, of which the following is a specification.

This invention relates to improvements in the construction of regulators for internal combustion engines and is particularly applicable to devices for regulating the charges of fuel admitted to oil engines and the like.

An object of the invention is to provide a regulator for variable quantity fluid discharging devices, which is simple in construction and efficient in operation.

One of the more specific objects is to provide a regulator for the fuel supply delivered to an oil engine and the like, in which the amount of fuel supplied may be accurately controlled in accordance with the desired operation of the engine.

Another object is to provide a simple device which may be either manually operated, normally automatically operated, or disconnected entirely when so desired.

Still another object is to provide a regulator in which the cost of manufacture is reduced to a minimum without impairing the efficiency of the device and in which the furnishing of repair parts is facilitated.

A further object is to provide a regulator in which the delivery of fuel charges is effected by means of a reciprocating displacement plunger, which plunger also serves the function of a relief valve.

It has heretofore been customary in some forms of charge regulators for internal combustion engines, to provide a chamber having valve controlled inlet and discharge passages and having a displacement plunger reciprocable therein to produce discharges of liquid fuel from the chamber. In these prior devices the variation of the quantity of fluid discharged is produced by means of devices permitting by-passing of some of the fluid displaced by the plunger, the quantity by-passed being dependent upon the load upon the engine. The control of the by-pass of the devices of the prior art is in most cases effected directly by some special mechanism and is not, as is the relieving in the present case, effected directly by the displacement plunger.

A clear conception of an embodiment of the invention, showing the same applied in a regulator for oil engines, may be had by referring to the drawing accompanying and forming a part of this specification, in which like reference characters designate the same or similar parts in the several views.

Figure 2:
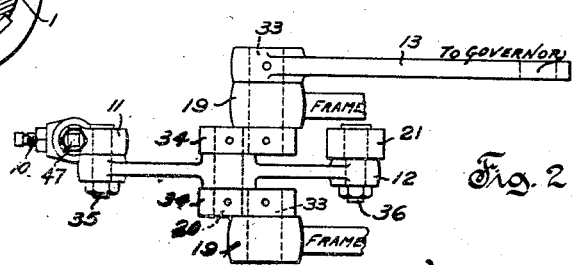

Figure 1 is a transverse vertical section through the valve casing and actuating shaft of a regulator for an oil engine, showing the speed governor for automatically varying the quantities of fuel pumped, diagrammatically. Fig. 2 is a top view of fragments of the lever supporting bearings, showing the arrangement of some of the levers of the device disclosed in Fig. 1.

The regulator casing 6, which is preferably formed of cast metal and in one piece, is supported from the engine frame 32 by means of cap screws or similar devices. The casing 6 is provided with a pair of intersecting bores 26, 53, forming a chamber, the bore 26 of which extends entirely through the casing and has its ends closed by means of plugs 43, 54. One portion of the bore 53 is counterbored and provided with a ported sleeve or bushing 41, the bore of which is in alinement with the remaining portion of the bore 53. The relief ports 31 formed in the bushing 41 connect the chamber formed by the intersecting bores 26, 53, with the cored relief chamber 23, which chamber is in direct and open communication with the inlet chamber 24. The upper extremity of the chamber 23 is provided with an air relief cock 51.

The fuel inlet chamber 24 is provided at its lowermost point with a drain opening which is normally closed by means of a pipe plug 48. The oil inlet pipe 25 connects directly with the chamber 24 and is adapted to feed the liquid fuel thereto from the source of supply which is normally under pressure sufficient to release air past relief cock 51. The bore 55 formed in the casing 6, has its one end opening directly into the chamber 24 and has its opposite end normally closed by means of a pipe plug 44. A passage which is under the control of a suction or inlet valve 30, connects the bores 26, 55, of the casing 6. The valve 30 is of the puppet type, being spring pressed to its seat by means of a helical compression spring 40, and being guided by means of a suitable combined guide and valve-removal-permitting plug 38.

The discharge valve 29 is of the puppet type and controls a connection formed between the bore 26 and a bore 27 formed in the casing 6. One end of the bore 27 is normally closed by means of a pipe plug 42. The discharge pipe 28 connects with the bore 27 and is adapted to convey the fuel charges from the regulator to the engine. The discharge valve 29 is of the puppet type, being spring pressed to its seat by means of a helical compression spring 39 and guided by means of a combined guide and valve-removal-permitting plug 37.

The valves 29, 30, are formed exactly alike, being interchangeable, as are also the springs 39, 40, and the plugs 37, 38. It will be noted that the vertical bore 53 is located intermediate the suction and discharge inlets leading to and from the bore 26, and that the various passages in the casing 6 may be readily formed by the use of drills. The pipe plugs 42, 43, 44 and 48, are preferably standard plugs, thus eliminating the necessity of providing special plugs.

The displacement device or plunger 18 is reciprocable within the bushing 41 and is normally urged upwardly by means of a helical compression spring 22 which fits the bore 53 of the casing 6. The upper end of the plunger 18 contacts directly with a roller 21 which is mounted upon one end of the floating lever 12 by means of a pin 36. The mid portion of the floating lever 12 is fulcrumed in the oscillating ends of the cranks 34 by means of a pivot pin 20. The opposite end of the lever 12 is connected to the member 11 by means of a pin 35. The member 11 is adjustably secured to the upper end of the connecting rod 7 by means of the set screws 10, 47. The opposite lower end of the connecting rod 7 is provided with a member 46 which is connected with the hand lever 4 by means of a pin 45. The hand lever 4 is pivoted to the stationary casing 6 by means of a pivot 5 and carries a roller 3 which normally bears against the cam 2 carried by the actuating shaft 1.

The connecting rod 7 is adjustable in length upon releasing the locking set screw 10, by means of the adjusting set screw 47 which is adapted to shift the rod 7 within the member 11. The lower end of the connecting rod 7 has secured thereon a clutching collar 8 which may be manually raised by means of the hand lever 4 until it is brought into engagement with an upper surface of the clutch spring 9 mounted upon the plug 54. With the clutch collar 8 thus raised and in engagement with the spring 9, the roller 3 on the hand lever 4 is beyond the path of travel of the periphery of the cam 2, and the operating mechanism for the plunger 18 is thrown out of engagement with the actuating shaft 1.

The cranks 34 are secured to the alined stub shafts 33 which are mounted in bearings 19 formed directly on the casing 6. One end of one of the stub shafts 33 has a lever 12 secured thereto, the oscillating end of which is secured to the governor link 14 by means of a pivot 49. The link 14 is pivotally connected to one end of the governor lever 15, the mid portion of which has a stationary pivotal fulcrum 16, and the opposite end of which is connected to the speed governor 17. While the speed governor has been disclosed as of the fly-ball type, it should be understood that any of the other well-known types may be substituted without departing from the scope of the present invention.

During the normal operation of the device the actuating shaft 1 is rotated continuously, carrying with it the actuating cam 2. The cam 2 alternately raises and permits lowering of the hand lever 4, the motion of which lever is transmitted through the connecting rod 7 to the end of the floating lever 12. As the floating lever 12 is oscillated through an arc by the movement of the cam 2, the roller 21 is alternately lowered and raised, thereby depressing and permitting elevation of the displacement plunger 18, and alternately compressing and permitting expansion of the helical spring 22. The spring 22 being under initial stress, forces the plunger 18 against the roller 21 at all times, thereby insuring continuous contact between the roller 3 and the cam 2. As the plunger 18 is raised within the chamber formed by the intersecting bores 26, 53, it tends to form a partial vacuum within this chamber, so that the pressure on the oil within the chamber 24 and bore 55 opens the suction valve 30 and the oil flows into the bore 26. As the plunger 18 is forced downwardly within the chamber, the pressure within the bore 26 is immediately increased and this increase in pressure together with the action of the spring 40, causes a quick closing of the suction valve 30 and an opening of the discharge valve 29. The opening of the discharge valve 29 permits oil to flow through the discharge bore 27 into the oil discharge 28 and from thence to the engine.

If the upper limit of the stroke of the plunger 18 is below the relief ports 31, all of the oil displaced by the plunger 18 is forced through the discharge valve 29 to the engine, this condition existing when the engine is operating under maximum load. If, however, the load on the engine decreases, the speed of the governor 17 increases and the governor end of the lever 15 is carried upwardly, causing the opposite end of this lever to move downwardly, carrying with it the link 14. The downward motion of the link 14 causes the pin 49 of the lever 13 to move downwardly and produces upward movement of the fulcrum pin 20 carried by the cranks 34. The upward motion of the fulcrum pin 20 permits the roller carrying end of the lever 12 to move upwardly through the action of the spring 22, thereby changing the position of the plunger 18. The stroke of this plunger however remains approximately the same. If the movement of the fulcrum pin 20 is sufficient to cause the displacement plunger to uncover the relief ports 31 during any portion of its reciprocation, the plunger during its downward stroke will, instead of forcing through the discharge valve 29, its entire displacement volume of oil, only begins to force therethrough the oil displaced after it cuts off relief ports 31. Some oil may during the upward stroke overflow by momentum into the relief chamber 23, from which it flows through the cored passage directly back into the inlet chamber 24 when the head permits. If the head in chamber 23 is higher than the cut-off edge of relief ports 31, oil during the upward stroke and after any oil has ceased to follow the plunger by momentum, will enter beneath the plunger 18 through relief ports 31 as a second inlet to the pump, but on the down stroke, all of the oil that so enters, as well as any oil following the plunger by momentum, will be released through these relief ports 31. This operation of the device, it will be noted, will cause less oil to be delivered to the engine because the plunger 18 does not descend so far as it did before the elevation of fulcrum pin 20, the amount of decrease being proportional to the increase in speed of the engine, or, in other words, directly proportional to the decrease in load. The proportioning of the amount of fuel delivered to the engine during normal operation is taken care of automatically by the speed governor, which, as previously stated, may however be displaced by any other load affected device.

In starting the engine and before the load is thrown in, it may be desirable to regulate the charges by hand. This may be done by a manual operation of the hand lever 4 to produce the desired operation. After the engine is in running condition, the manual operation of the lever 4 may be discontinued, when the actuating cam 2 in combination with the governor will immediately become effective in producing automatic regulation. Before starting the engine it may be desirable to release through the valve cock 51 any air which may be confined in the upper end of the chamber 23. The head of oil in the inlet must of course be sufficient to drive out such air.

In order to stop the engine all that is necessary to be done is to manually raise the hand lever 4 until the clutch collar 8 is clutched by the spring 9, when the connection 7 and lever 4 will be held upwardly and the cam 2 will be out of engagement with the roller 3. The plunger 18 will then be held in a fixed upper position by the roller 21, thus discontinuing the delivery of fuel charges to the engine. If it is desired to release the disconnecting device, this may be done by manually pressing back the spring 9, thus causing the spring 22 to become effective in restoring the mechanism to the position shown in Fig. 1.

It will be noted that besides serving the function of a displacement plunger for delivering charges of oil to the oil discharge 28, the plunger 18 also serves the function of a relief valve. The position of the limits of stroke of the plunger 18 is automatically varied by the speed governor which may also be arranged to vary the length of stroke of the plunger. The position of limits of the stroke of the plunger 18 may also be slightly varied by manipulation of the adjusting set screws 10, 47. The manipulation of the adjusting set screws 10, 47, is however only necessary in preliminarily setting the mechanism. It should also be noted that by permitting the formation of chambers and passages within the casing 6 by the use of drills, these casings can be manufactured at minimum cost and with the use of jigs, thereby making them interchangeable. This feature is of importance since several regulating devices are generally used on each engine and any one of them may readily be replaced without great difficulty. The provision of a bushing 41 also permits accurate location of the ports 31 and permits the use of special wearing metal to form a bearing for the reciprocating plunger 18. The valves 29, 30, may be readily removed by removal of the caps 37, 38, and may be interchanged if so desired. If it is desired to inspect the interior of casing 6, the oil may be withdrawn therefrom through the drain plug 48.

While the device is disclosed as a regulator for internal combustion engines, the same may also be applicable to other arts and it is not intended by such disclosure to limit the invention. It should be understood that it is not desired to be limited to the exact details of construction shown and described, for obvious modifications will occur to a person skilled in the art.

It is claimed and desired to secure by Letters Patent,—

1. In combination, a casing forming a chamber, a valve for admitting fluid to said chamber, a valve for permitting discharge of fluid from said chamber, a relief port leading from said chamber, a displacement plunger operating within said chamber and directly controlling the discharge of fluid through said relief port, means for normally automatically operating said plunger, means for automatically varying the limits of stroke of said plunger, and means for permitting manual actuation of said plunger.

2. In a regulator for combustion engines, a casing forming a chamber, means for admitting fluid to said chamber, means for permitting discharge of fluid from said chamber, a relief port connecting said chamber with the inlet side of said admission means, and a displacement device operating within said chamber and directly controlling the discharge of fluid through said relief port.

3. In combination, a casing forming a chamber, a valve for admitting fluid to said chamber, a valve for permitting discharge of fluid from said chamber, a relief port leading from said chamber, a displacement plunger reciprocating within said chamber and directly controlling the discharge of fluid through said relief port, means for reciprocating said plunger, and means for varying the position of the limits of stroke of said plunger.

4. In combination, a casing forming a chamber, a valve for admitting fluid to said chamber, a valve for permitting discharge of fluid from said chamber, a relief port leading from said chamber, a displacement plunger reciprocating within said chamber and directly controlling the discharge of fluid through said relief port, means for operating said plunger, and a speed governor for varying the limits of stroke of said plunger.

5. In combination, a casing forming a chamber, a valve for admitting fluid to said chamber, a valve for permitting discharge of fluid from said chamber, a relief port leading from said chamber, a displacement plunger operating within said chamber and directly controlling the discharge of fluid through said relief port, means for normally automatically operating said plunger, and means for permitting manual actuation of said plunger.

6. In combination, a casing forming a chamber, a valve for admitting fluid to said chamber, a valve for permitting discharge of fluid from said chamber, a relief port leading from said chamber, a displacement plunger reciprocating within said chamber and directly controlling the discharge of fluid through said relief port, means for operating said plunger, and means for disengaging said operating means.

In testimony whereof, the signature of the inventor is affixed hereto in the presence of two witnesses.

CARL G. SPRADO.

Witnesses:
W. H. LIEBER,
J. J. KANE.